(12) United States Patent
Bjorkman (10) Patent No.: US 11,945,193 B2
(45) Date of Patent: Apr. 2, 2024

(54) DIMENSIONALLY STABLE COMPOSITE WOOD PANEL FLOORING AND METHODS OF PREPARING SAME

(71) Applicant: AHF, LLC, Mountville, PA (US)

(72) Inventor: Travis E. Bjorkman, Lancaster, PA (US)

(73) Assignee: AHF, LLC, Mountville, PA (US)

( * ) Notice: Subject to any disclaimer, the term of this patent is extended or adjusted under 35 U.S.C. 154(b) by 309 days.

(21) Appl. No.: 17/198,633

(22) Filed: Mar. 11, 2021

(65) Prior Publication Data

US 2022/0288897 A1 Sep. 15, 2022

(51) Int. Cl.
*B32B 37/12* (2006.01)
*B32B 7/12* (2006.01)
(Continued)

(52) U.S. Cl.
CPC .............. *B32B 21/042* (2013.01); *B32B 7/12* (2013.01); *B32B 37/12* (2013.01); *E04F 15/046* (2013.01); *B32B 2038/0016* (2013.01); *B32B 2307/72* (2013.01); *B32B 2317/16* (2013.01); *B32B 2471/00* (2013.01)

(58) Field of Classification Search
CPC ......... B32B 21/042; B32B 7/12; B32B 37/12; B32B 2038/0016; B32B 2307/72; B32B 2317/16; B32B 2471/00; B32B 21/02; B32B 2255/08; B32B 2255/28; B32B 2307/722; B32B 2307/732; B32B 21/14; B32B 2255/26; B32B 2419/04;
(Continued)

(56) References Cited

U.S. PATENT DOCUMENTS 1,999,243 A 4/1935 Loetscher
2,713,014 A 7/1955 Johnson
(Continued)

FOREIGN PATENT DOCUMENTS

CN 2714697 Y 8/2005
CN 101439525 A * 5/2009
(Continued)

OTHER PUBLICATIONS

CN111958735A Machine Translation of Description (Year: 2023).*
CN101439525A Machine Translation of Description (Year: 2023).*

*Primary Examiner* — Cynthia L Schaller
(74) *Attorney, Agent, or Firm* — Budzyn IP Law, LLC (57) ABSTRACT

In one aspect, a method of preparing a composite wood panel is provided herein which includes: providing a flat core formed of cellulosic material having opposing top and bottom faces, wherein a density profile is defined across the core representing density of the core at different locations between the top and bottom faces, the density profile including a first density profile portion extending from the bottom face towards the top face and including a first maximum density, a second density profile portion extending from the top face towards the bottom face and including a second maximum density, and a third density profile portion extending between, and connecting, the first and second density profile portions; removing the top face, and an adjacent layer, of the core to remove the second maximum density and to define an exposed face; and, adhering, using an adhesive, a veneer to the exposed face.

21 Claims, 6 Drawing Sheets

(51) Int. Cl.
*B32B 21/04* (2006.01)
*B32B 38/00* (2006.01)
*E04F 15/04* (2006.01)

(58) Field of Classification Search
CPC ..... E04F 15/046; E04F 13/0866; E04F 13/10; E04F 13/16; E04F 15/045
See application file for complete search history.

(56) References Cited

U.S. PATENT DOCUMENTS

| | | | |
|---|---|---|---|
| 2006/0032167 A1* | 2/2006 | Cecilio | E04F 15/02 52/384 |
| 2010/0326011 A1* | 12/2010 | Norling | E04C 2/24 52/796.1 |
| 2017/0334088 A1* | 11/2017 | Lehnhoff | B44C 5/04 |
| 2018/0238062 A1 | 8/2018 | Bjorkman et al. | |

FOREIGN PATENT DOCUMENTS

| | | | |
|---|---|---|---|
| CN | 201371486 | Y | 12/2009 |
| CN | 111958735 | A * | 11/2020 |
| JP | 3271894 | B2 | 4/2002 |
| JP | 3753473 | B2 | 3/2006 |
| JP | 3768300 | B2 | 4/2006 |
| JP | 3836239 | B2 | 10/2006 |
| JP | 3903401 | B2 | 4/2007 |
| JP | 4156048 | B2 | 9/2008 |
| JP | 4315542 | B2 | 8/2009 |
| JP | 2008039323 | A | 9/2009 |
| JP | 2014113825 | A | 6/2014 |
| JP | 5770418 | B2 | 8/2015 |
| JP | 5816668 | B2 | 11/2015 |

\* cited by examiner

DIMENSIONALLY STABLE COMPOSITE WOOD PANEL FLOORING AND METHODS OF PREPARING SAME

BACKGROUND OF THE INVENTION

Field of the Invention

A dimensionally stable wood panel, and method of making same, are included. The wood panel includes a cellulosic core and a veneer.

Summary of Related Art

Engineered wood panels have been created to provide the natural beauty of wood while providing one or more benefits not available for solid wood panels. For example, an engineered wood panel typically has a core with a higher density than an applied veneer. The veneer is applied to provide a more aesthetically acceptable appearance than the core, with the veneer providing the look of real wood, as opposed to the unattractive, processed appearance of the core.

Typically, the core is internally balanced, as a result of formation, thereby having dimensional stability in an unaltered state. However, the application of the veneer to one face thereof provides pulling forces on the top of the structure with no offsetting balancing force on the opposing bottom face. Left unchecked, this structure would warp or bow. This is resolved in the prior art by the inclusion of a balance layer on the bottom face of the core opposite the veneer. The application of the balance layer provides the needed offsetting balancing force, thus providing dimensional stability to the overall structure. The use of a balance layer, however, adds cost, and thickness to the final product.

SUMMARY OF THE INVENTION

In one aspect, with the subject invention, a method of preparing a composite wood panel is provided which includes: providing a flat core formed of cellulosic material having opposing top and bottom faces, wherein a density profile is defined across the core representing density of the core at different locations between the top and bottom faces, the density profile including a first density profile portion extending from the bottom face towards the top face and including a first maximum density, a second density profile portion extending from the top face towards the bottom face and including a second maximum density, and a third density profile portion extending between, and connecting, the first and second density profile portions; removing the top face, and an adjacent layer, of the core to remove the second maximum density and to define an exposed face; and, adhering, using an adhesive, a veneer to the exposed face.

In a further aspect, with the subject invention, a composite wood panel is provided by the method of the preceding paragraph.

In yet a further aspect, with the subject invention, a method of preparing a composite wood panel is provided which includes: providing an elongated high density fiberboard panel having opposing top and bottom faces and longitudinally spaced-apart first and second ends; removing the top face of the elongated high density fiberboard panel sufficiently to cause end lifting of the first and second ends of the high density fiberboard panel, the removing defining an exposed face on the high density fiberboard panel; and, adhering, using adhesive, veneer to the exposed face.

In still a further aspect, with the subject invention, a composite wood panel is provided by the method of the preceding paragraph.

As used herein, the term "dimensional stability," and derivatives thereof, means the internal resistance of a wood panel to cupping, bowing, or warping. The density profile of a core has been found to affect the dimensional stability of a composite wood panel, e.g., an engineered wood panel. By altering the core to change the density profile in accordance with the subject invention, a veneer can be adhered to the altered core to provide dimensional stability to the resulting composite structure without the need of a balance layer.

Advantageously, the subject invention provides a cost-effective dimensionally stable composite wood panel useable for flooring.

DETAILED DESCRIPTION OF THE INVENTION

Figure 1:
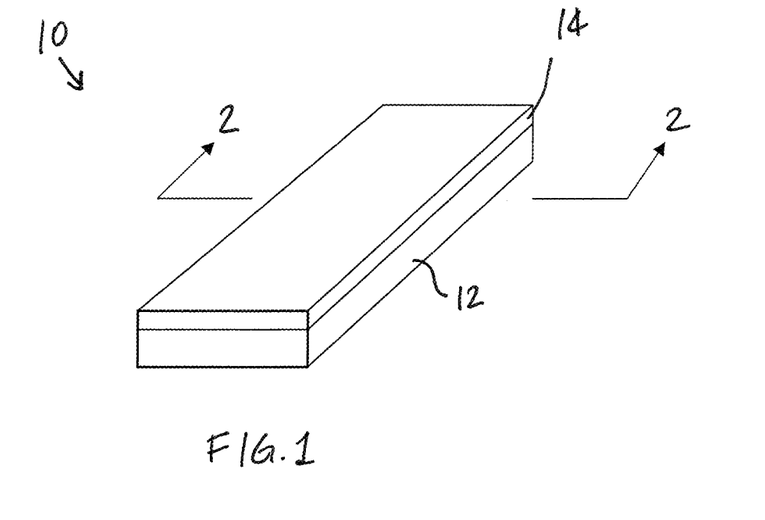
FIG. 1 is a perspective view of a composite wood panel formed in accordance with the subject invention.
Figure 2:
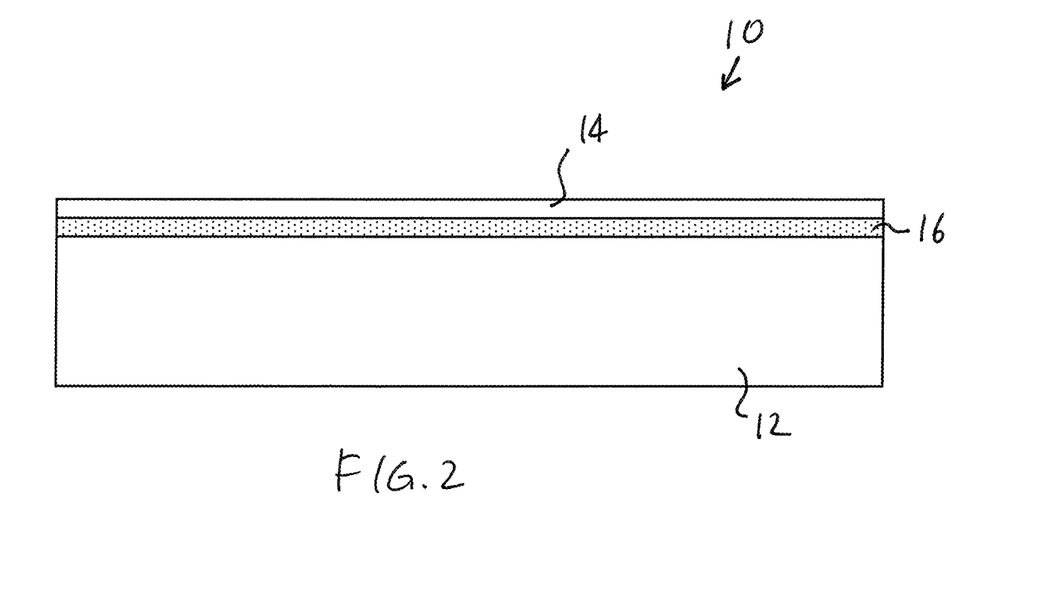
FIG. 2 is a cross-sectional view taken along line 2-2 of FIG. 1.

With reference to FIG. 1, a composite wood panel, in accordance with the subject invention, is shown and generally designated with reference numeral 10. The composite wood panel 10 generally includes three layers, as shown in FIG. 2, a core 12, a veneer 14, and an adhesive 16. The composite wood panel 10 is dimensionally stable.

As used herein, the term "panel" refers to any structural unit including, but not limited to, a plank, board or tile. A panel is a three-dimensional structure having a length, width and thickness. As used herein, the modifier "composite wood" used in connection with "panel" refers to a multi-layered panel having at least one structural component which includes cellulosic material. As will be understood by those skilled in the art, a "composite wood panel" may include non-cellulosic materials, such as adhesive.

Figure 3:
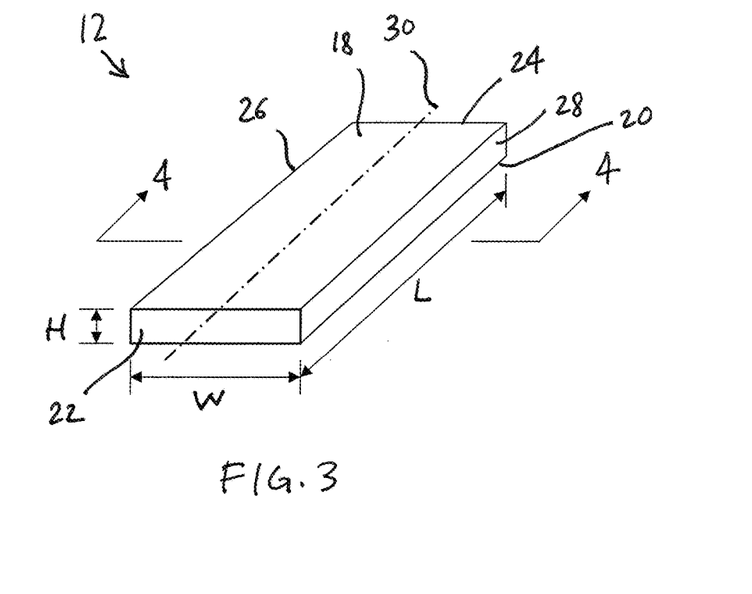
FIG. 3 is a perspective view of a core useable with the subject invention.

With reference to FIG. 3, the core 12 has opposing top and bottom faces 18, 20, extending between spaced-apart first and second ends 22, 24 and spaced-apart first and second sides 26, 28. The core 12 may be elongated to extend along a longitudinal axis 30, having a greater length L between the first and second ends 22, 24 than a width W between the first and second sides 26, 28.

The core 12 includes cellulosic material, preferably being formed thereby. With regards to the subject invention, the cellulosic material is not natural wood. Preferably, the core 12 is an engineered wood, formed by combining cellulosic particles, such as wood fiber, dust, strand, or other configurations, with resin and pressed into shape. The cellulosic material for the core 12 may be one or more of: fiberboard (e.g., high density fiberboard, medium density fiberboard), particle board, and strand board. Preferably, the core 12 is a continuous plank, board, or tile homogenously formed of the same cellulosic material throughout. In addition, preferably, the core 12 has a constant cross-section along its length L. The core 12 may have a thickness in the range of about 1 mm to about 15 mm, such as 4 mm to about 15 mm or about 6 mm to about 10 mm.

Figure 4:
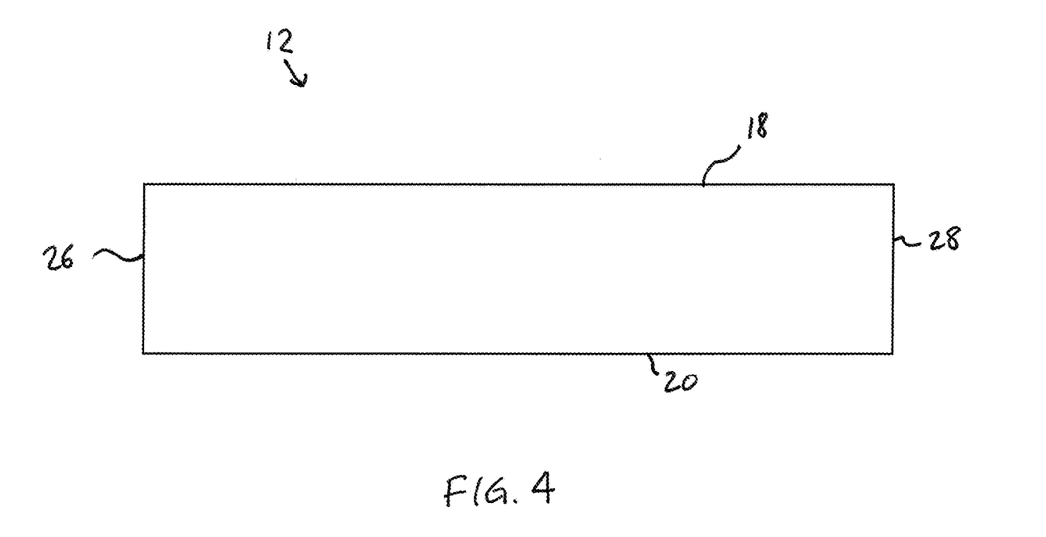
FIG. 4 is cross-sectional view taken along line 4-4 of FIG. 3.

FIG. 4 shows a cross-section of the core 12. As is known in the art, the core 12, as being formed of engineered wood, shall have an internal density profile, which can vary vertically (as defined in a thickness or height H direction (FIG. 3) between the top and bottom faces 18, 20). The terms "thickness" and "height" are used interchangeably herein. The density profile may be affected by various factors during formation, including pressure, moisture, and temperature.

Figure 5:
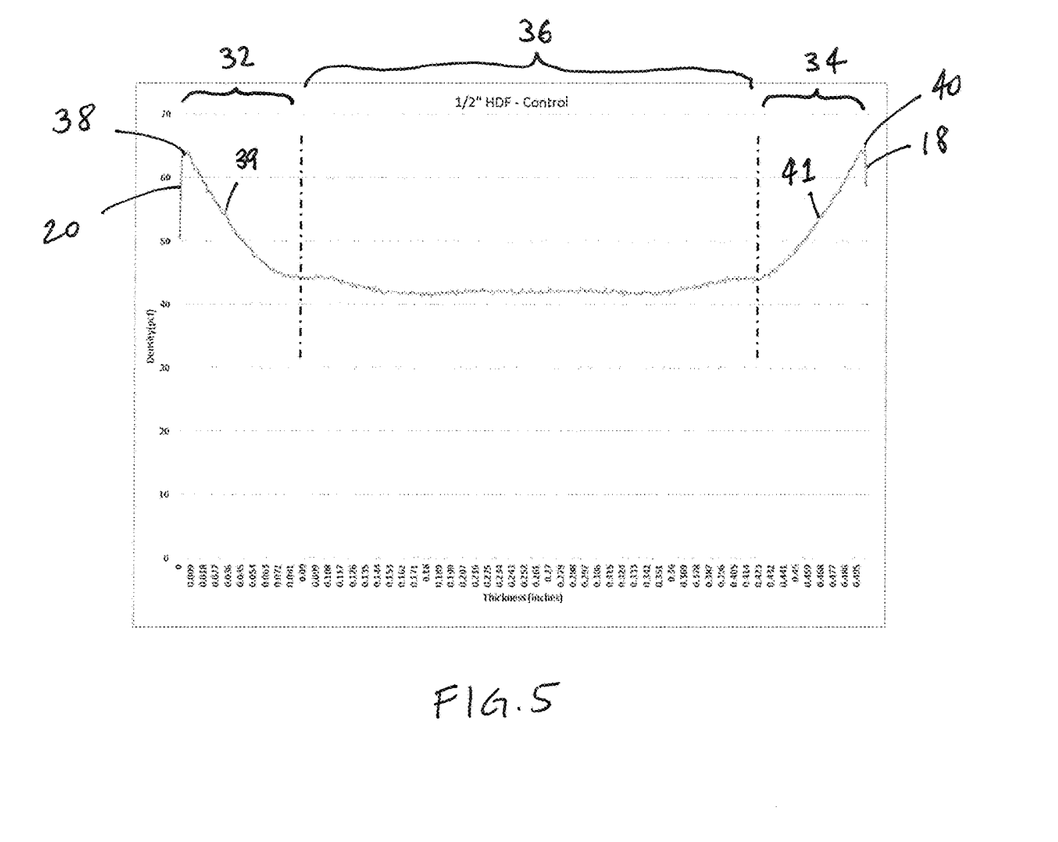
FIG. 5 shows a typical vertical density profile for engineered wood unaltered after formation.

FIG. 5 shows a typical vertical density profile for engineered wood unaltered after formation. As used herein, the terms "vertical density profile" and "density profile" are used interchangeably to refer to the graphic profile produced by a vertical density profilometer (VDP), such as a vertical density profilometer sold under the name "Dense-Lab X" by Electronic Wood Systems of Hamelin, Germany, or that sold by Quintek Measurement Systems of Knoxville, Tennessee A VDP operates to measure density throughout the thickness of a panel at fixed increments. FIG. 5 shows a vertical density profile for a piece of high density fiberboard having a thickness of 0.5 inches with density measurements at every 0.001 inches. The abscissa (x-axis) extends from zero at the origin and increases in height in a rightward direction, while the ordinate (y-axis) extends from zero at the origin and increases upwardly to represent increasing density in units of pounds per cubic foot (pcf).

The vertical density profile shown in FIG. 5 is typical for engineered wood after formation. Considering this density profile in terms of the core 12, the left end of the vertical density profile corresponds to the bottom face 20 and the right end of the vertical density profile corresponds to the top face 18. Thus, as is typical, the density profile is generally symmetrical with regions of increased density adjacent to the top and bottom faces 18, 20. As shown in FIG. 5, the vertical density profile can be separated into three portions: a first density profile portion 32 extending from the bottom face 20, towards the top face 18; a second density profile portion 34 extending from the top face 18, towards the bottom face 20; and, a third density profile portion 36 extending between, and connecting, the first and second density profile portions 34, 36. The first density profile portion 34 has a first maximum density 38. Likewise, the second density profile portion 36 includes a second maximum density 40. Without alteration of the core 12, the first and second maximum densities 38, 40 are generally equal.

As shown in FIG. 5, the third density profile portion 36 is wholly below the first and second maximum densities 38, 40. As such, the portion of the core 12 corresponding to the third density profile portion 36 has densities which are all less than both the first and second maximum densities 38, 40. A first gradient 39 extends from the first maximum density 38 to the third density profile portion 36, representing the drop in density from the first maximum density 38 to the third density profile portion 36. Likewise, a second gradient 41 extends from the second maximum density 40 to the third density profile portion 36, representing the drop in density from the second maximum density 40 to the third density profile portion 36.

Figure 6:
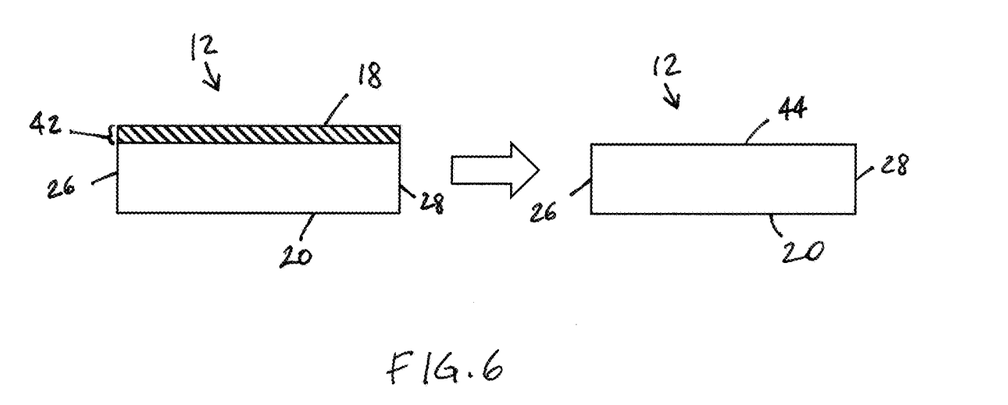
FIG. 6 shows schematically removal of the top face, and an adjacent layer, of the core in accordance with the subject invention.

With reference to FIG. 6, with the subject invention, the top face 18 of the core 12 is removed, along with an adjacent layer 42 (shown in cross hatching), to define an exposed face 44 for the core 12. The removal may be by one or more of: sanding, planing, cutting (e.g., sawing), and combinations thereof.

Figure 10:
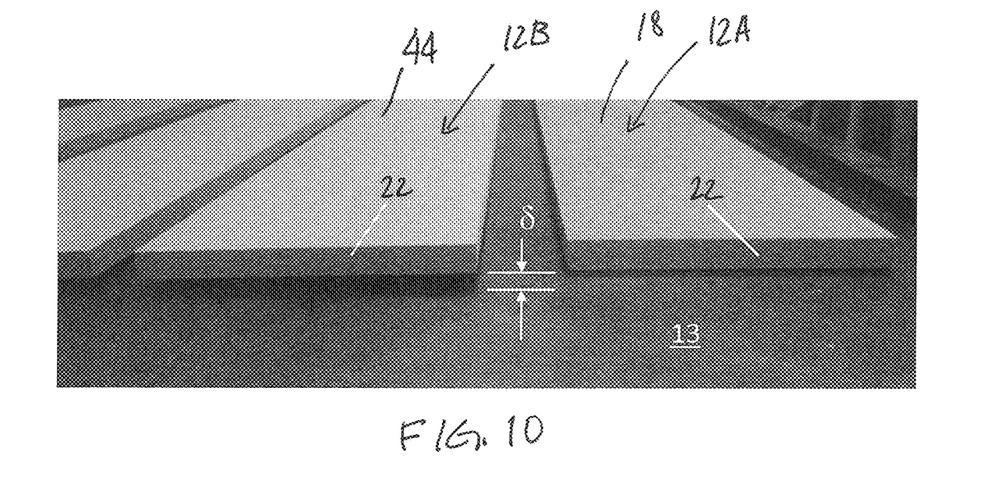
FIG. 10 shows end lifting of an altered core in accordance with the subject invention.

The removal of the top face 18 and the adjacent layer 42 causes an internal imbalance in the core 12, resulting from the density profile being altered to be not symmetrical. In particular, with reference to FIG. 7, the altered density profile is shown. The first maximum density 38 in the first density profile portion 34 remains the same. The adjacent layer 42 has sufficient thickness to remove the second maximum density 40, resulting in an altered second maximum density 40' which is less than the first maximum density 38. This difference in density between the bottom face 20 and the exposed face 44, results in an internal imbalance in the core 12 with forces acting in the direction of the exposed face 44. This internal imbalance may cause bowing with end lifting of the first and second ends 22, 24 (i.e., a loss of planarity in the core 12). For example, FIG. 10 shows a control core 12A, which is unaltered, and an altered core 12B, altered as described above to form the exposed face 44. The altered core 12B exhibits end lifting with the first end 22 of the altered core 12B being lifted a distance δ relative to a support surface 13 with the first end 22 of the control core 12A generally resting on the support surface 13. Although not shown, the second end 24 of the altered core 12B would be likewise lifted of about the same distance δ. The end lifting of the first and second ends 22, 24 is about a mid-point of the altered core 12B. The first and second ends 22, 24 may be lifted symmetrically about a longitudinal center of the altered core 12B.

The thickness of the adjacent layer 42 that must be removed to provide the desired altered density profile may be determined by first measuring the density profile of the core 12. Generally, the thickness of the core 12 will be decreased by an amount of about 0.2 mm to about 2 mm or about 0.2 mm to about 0.5 mm. Stated differently, the thickness of the adjacent layer 42 may be about 0.2 mm to about 2 mm or about 0.2 mm to about 0.5 mm. When considered from the perspective of a percent of the thickness of the core 12, the reduction may be about 1% to about 14% of the thickness of the core 12, with removal of the top face 18 and the adjacent layer 42.

Figure 8:
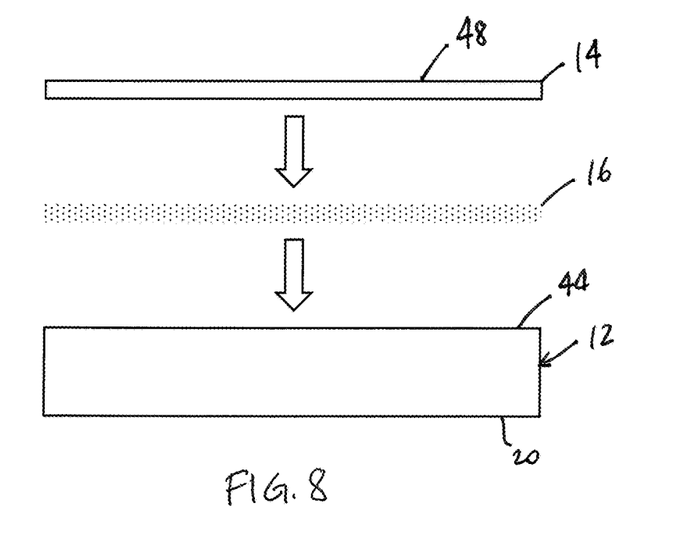
FIG. 8 shows schematically assembly of a composite wood panel in accordance with the subject invention.

As shown in FIG. 8, the veneer 14 is applied to the exposed face 44 of the core 12 using the adhesive 16 to provide the composite wood panel 10 as shown in FIGS. 1 and 2. The application of the veneer 14 offsets the internal imbalance of the core 12, providing dimensional stability to the composite wood panel 10.

The veneer 14 may be of any known type, including, but not limited to, being formed from one or more of: aspen, poplar, hickory, maple, oak, beech, ash, cherry, mahogany, and combinations thereof. The veneer 14 may have a thickness in the range of 0.6 mm to 5 mm, more preferably, 1.2 mm to 4 mm.

The adhesive 16 may be of any known type, including, but not limited to, one or more of: polyvinyl acetate, urea formaldehyde, melamine urea formaldehyde, acid-catalyzed phenolic resin, methylene diphenylene isocyanate (MDI), and combinations thereof.

The composite wood panel 10 is provided as a structure of the core 12, the veneer 14, and the adhesive 16, with the bottom face 20 of the core being unaltered and exposed. The subject invention avoids the need for a balance layer being mounted to the bottom face 20. Advantageously, the composite wood panel 10 is dimensionally stable, resistant to warping, bowing, or cupping.

Figure 7:
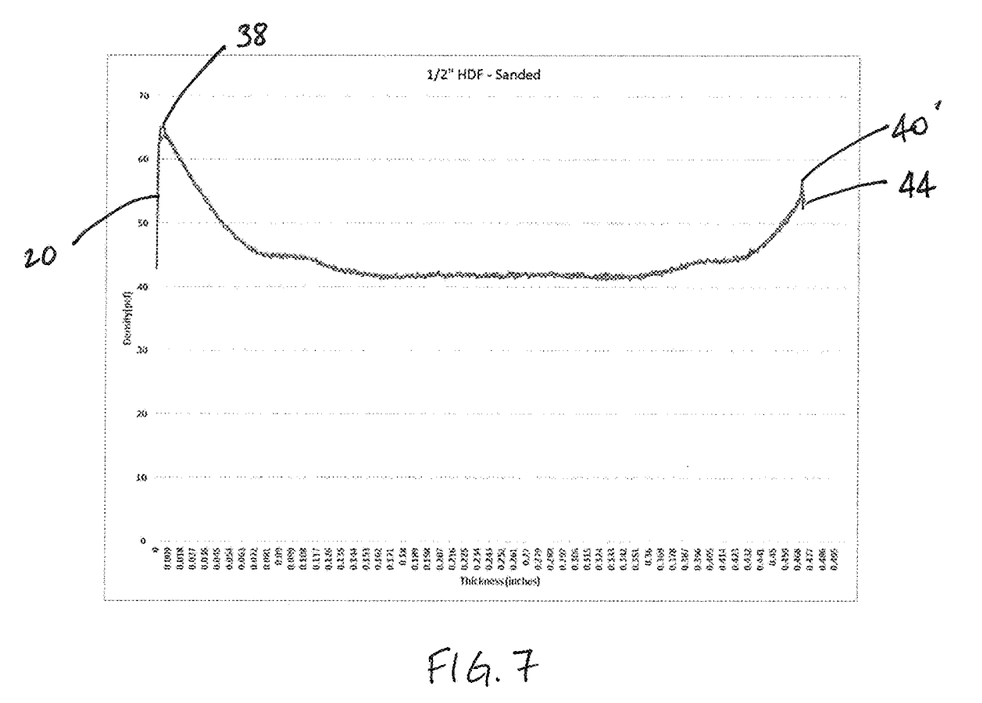
FIG. 7 shows a vertical density profile of an altered core in accordance with the subject invention.
Figure 9:
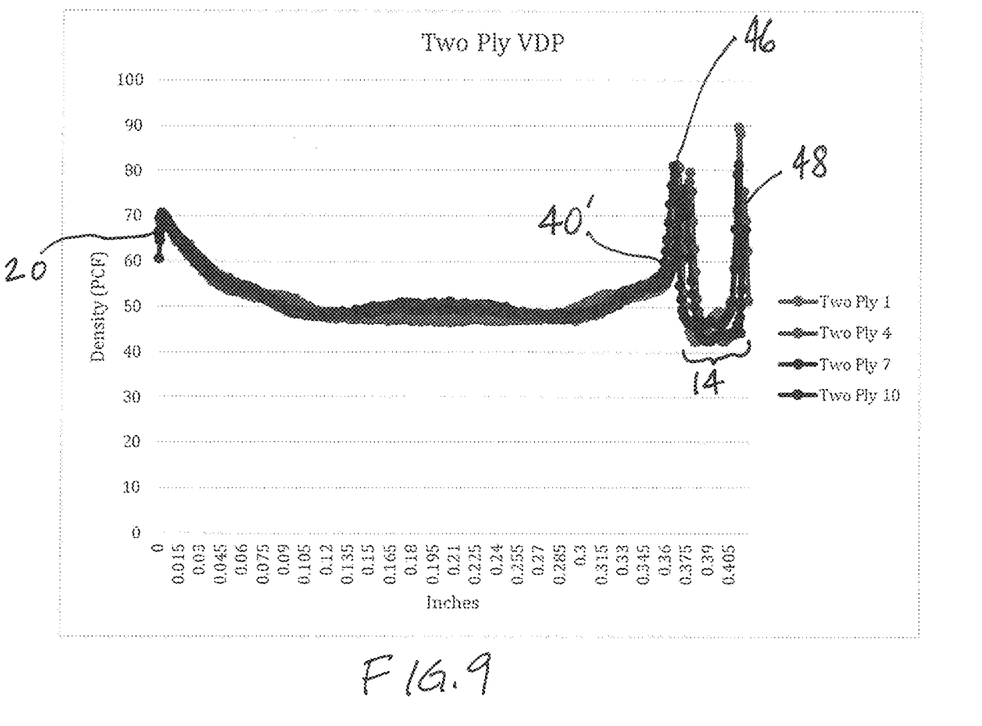
FIG. 9 shows vertical density profiles of composite wood panels in accordance with the subject invention.

With reference to FIG. 9, representative vertical density profile of the composite wood panel 10 is shown. The density profile shown in FIG. 9 is a composite of four different density profiles of different prepared composite wood panels. As shown, the density profile of the composite wood panel 10 from the bottom face 20 to the altered second maximum density 40' remains generally the same as shown in FIG. 7. With the composite wood panel 10, the adhesive 16, adjacent to the exposed face 44, provides a higher density than the core 12, and thus the density creates a spike 46 adjacent to the altered second maximum density 40'. The veneer 14, adjacent to the adhesive 16, has a lower density than both the core 12 and the adhesive 16, and thus the density profile shows a U-shape representing the drop in density from the adhesive 16 to the interior of the veneer 14 to high density at the exposed face 48 of the veneer 14.

It is desired to have the density of the exposed face 48 of the veneer 14 be equal to, or greater than, the density of the bottom face 20. This provides an equalization of density across the thickness of the composite wood panel 10. It is also noted that the adhesive 16, although of high density, is applied in a thin coating thus not disrupting the equalization of density. It is also noted that the thickness of the adjacent layer 42 may be determined based on the thickness of the veneer 14. For example, with the veneer 14 being of greater thickness more of the core 12 should be removed, i.e., the thickness of the adjacent layer 42 shall be greater. The converse applying with the veneer 14 being of lesser thickness. This function responds to increased losses or gains in density in the vertical density profile resulting from a thicker or thinner veneer 14. The location of the altered second maximum density 40' is adjusted along the overall vertical density profile (moving left or right) in response to the thickness of the veneer 14. As will be appreciated by those skilled in the art, variability in materials and thicknesses of the core 12 and the veneer 14 provide for variability in resulting vertical density profiles. The subject invention provides for review of vertical density profiles in determining the thickness of the adjacent layer 42 to provide balance between the exposed face 48 of the veneer 14 and the bottom face 20, as discussed above.

The composite wood panel 10 is particularly well-suited for use as flooring or wall covering. The composite wood panel 10 may have one or more coatings applied thereto, particularly to the veneer 14, for water resistance, wear resistance, and so forth.

Overall, the composite wood panel 10 may have any suitable thickness depending on the desired end use. For example, the thickness may be about 2 mm to about 30 mm. Another useful range is 6 mm to about 20 mm. For flooring, the thickness of the composite wood panel 10 may be about 4 mm to about 25 mm. For walls, a thinner panel may be desired, such as about 2 mm to about 10 mm.

The features and advantages of the present invention are more fully shown by the following examples which are provided for purposes of illustration and are not to be construed as limiting the invention in any way.

EXAMPLES

Example 1

The top 0.5 mm of an elongated 0.5 in high density fiberboard plank was sanded off to create an exposed face. The vertical density profile of the resulting altered plank is shown in FIG. 7. The altered plank bowed, with end lifting. The altered plank is shown as the altered core 12B in FIG. 10. A separate sliced ash veneer was adhered to the sanded side (exposed face) of the altered plank using polyvinyl acetate (PVA) glue and cold pressing. This resulting structure was flat.

Example 2

Figure 11:
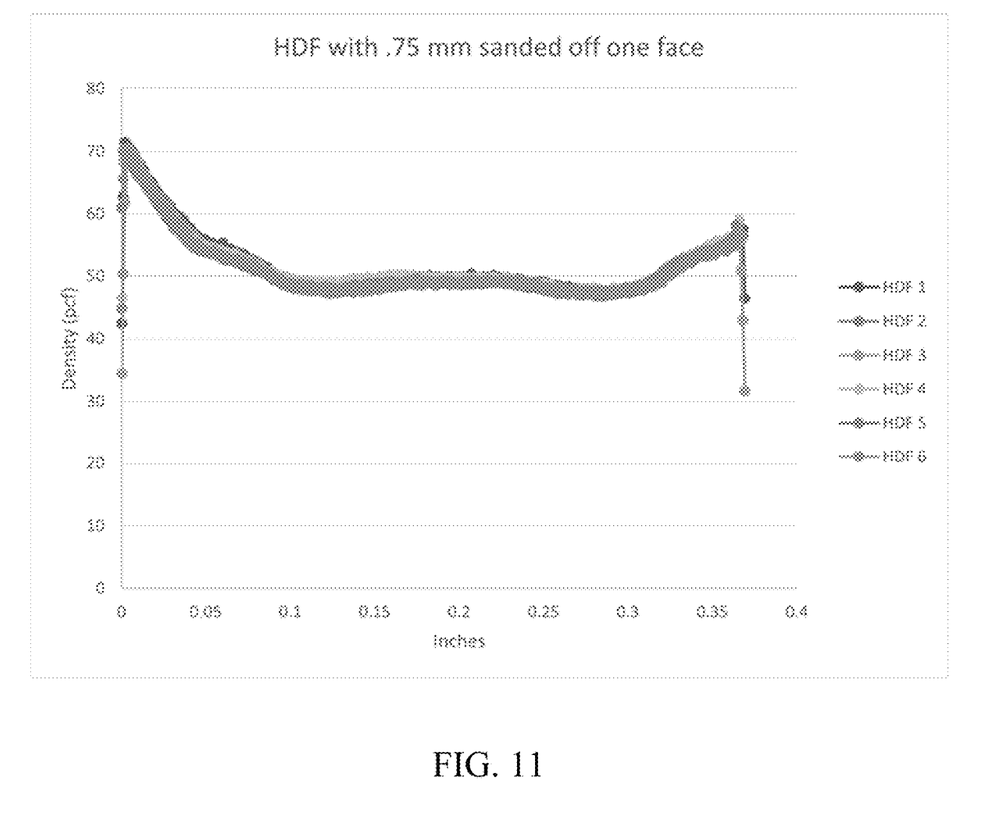
FIG. 11 shows vertical density profiles of altered high density fiberboards in accordance with the subject invention.

A two-ply structure was prepared using a 10.1 mm high density fiberboard panel and a veneer. The high density fiberboard panel was altered by sanding off 0.75 mm on a top face to create an exposed face. The resulting vertical density profiles of six altered high density fiberboard panels, formed in accordance with this Example, are shown in FIG. 11.

A veneer of 1.2 mm red oak was applied to the exposed face with an urea formaldehyde (UF) adhesive and hot pressing. The vertical density profiles of four resulting two ply structures, formed in accordance with this Example, are shown in FIG. 9.

The resulting two ply structures were installed as flooring components with no issues and were flat.

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

What is claimed is:

1. A method of preparing a composite wood panel, the method comprising:
    providing a flat core formed of cellulosic material having opposing top and bottom faces, wherein a density profile is defined across the core representing density of the core at different locations between the top and bottom faces, the density profile including a first density profile portion extending from the bottom face towards the top face and including a first maximum density, a second density profile portion extending from the top face towards the bottom face and including a second maximum density, and a third density profile portion extending between, and connecting, the first and second density profile portions;
    removing the top face, and an adjacent layer, of the core to remove the second maximum density and to define an exposed face; and,
    adhering, using an adhesive, a veneer to the exposed face, wherein a thickness of the adjacent layer is predetermined based at least on a thickness of the veneer,
    wherein the veneer, when adhered to the exposed face, has a veneer exposed face facing away from the core, the veneer exposed face having a density equal to, or greater than, a density of the bottom face.

2. The method as in claim 1, wherein the first density profile portion includes a first gradient representing a drop in density from the first maximum density to the third density profile portion.

3. The method as in claim 2, wherein the second density profile portion includes a second gradient representing a drop in density from the second maximum density to the third density profile portion.

4. The method as in claim 3, wherein the third density profile portion is wholly below the first and second maximum densities.

5. The method as in claim 1, wherein the removing the top face, and the adjacent layer, of the core yields an adjusted maximum density for the second density profile portion, the adjusted maximum density being less than the first maximum density.

6. The method as in claim 1, wherein the cellulosic material is selected from the group consisting of: high density fiberboard, medium density fiberboard, particle board, and, strand board.

7. The method as in claim 1, wherein the removing is by one or more of: sanding, planing, cutting, and combinations thereof.

8. The method as in claim 1, wherein the veneer is formed from one or more selected from the group consisting of: aspen, poplar, hickory, maple, oak, beech, ash, cherry, mahogany, and combinations thereof.

9. The method as in claim 1, wherein the adhesive includes one or more selected from the group consisting of: polyvinyl acetate, urea formaldehyde, melamine urea formaldehyde, acid-catalyzed phenolic resin, methylene diphenylene isocyanate (MDI), and combinations thereof.

10. The method as in claim 1, wherein the removing the top face, and the adjacent layer, of the core results in decreasing the thickness of the core between the top and bottom faces by about 0.2 to 2 mm.

11. The method as in claim 1, wherein the removing the top face, and the adjacent layer, of the core results in decreasing the thickness of the core between the top and bottom faces by about 14%.

12. A method of preparing a composite wood panel, the method comprising:
providing a flat core formed of material selected from the group consisting of: high density fiberboard, medium density fiberboard, particle board, and, strand board, the core having opposing top and bottom faces, wherein a density profile is defined across the core representing density of the core at different locations between the top and bottom faces, the density profile including a first density profile portion extending from the bottom face towards the top face and including a first maximum density, a second density profile portion extending from the top face towards the bottom face and including a second maximum density, and a third density profile portion extending between, and connecting, the first and second density profile portions;
providing a veneer having a thickness;
predetermining, based on at least the thickness of the veneer, a thickness of a layer adjacent to the top face to be removed from the core to remove the second maximum density;
removing the top face and the adjacent layer to define an exposed face on the core; and,
adhering, using an adhesive, the veneer to the exposed face,
wherein the veneer, when adhered to the exposed face, has a veneer exposed face facing away from the core, the veneer exposed face having a density equal to, or greater than, a density of the bottom face.

13. The method as in claim 12, wherein the first density profile portion includes a first gradient representing a drop in density from the first maximum density to the third density profile portion.

14. The method as in claim 13, wherein the second density profile portion includes a second gradient representing a drop in density from the second maximum density to the third density profile portion.

15. The method as in claim 14, wherein the third density profile portion is wholly below the first and second maximum densities.

16. The method as in claim 12, wherein the removing the top face, and the adjacent layer, of the core yields an adjusted maximum density for the second density profile portion, the adjusted maximum density being less than the first maximum density.

17. The method as in claim 12, wherein the removing is by one or more of: sanding, planing, cutting, and combinations thereof.

18. The method as in claim 12, wherein the veneer is formed from one or more selected from the group consisting of: aspen, poplar, hickory, maple, oak, beech, ash, cherry, mahogany, and combinations thereof.

19. The method as in claim 12, wherein the adhesive includes one or more selected from the group consisting of: polyvinyl acetate, urea formaldehyde, melamine urea formaldehyde, acid-catalyzed phenolic resin, methylene diphenylene isocyanate (MDI), and combinations thereof.

20. The method as in claim 12, wherein the removing the top face, and the adjacent layer, of the core results in decreasing the thickness of the core between the top and bottom faces by about 0.2 to 2 mm.

21. The method as in claim 12, wherein the removing the top face, and the adjacent layer, of the core results in decreasing the thickness of the core between the top and bottom faces by about 14%.

\* \* \* \* \*